(12) United States Patent
Duheille (10) Patent No.: US 9,448,714 B2
(45) Date of Patent: Sep. 20, 2016

(54) TOUCH AND NON TOUCH BASED INTERACTION OF A USER WITH A DEVICE

(71) Applicant: Elo Touch Solutions, Inc., Menlo Park, CA (US)

(72) Inventor: Remi Duheille, Rueil Malmaison (FR)

(73) Assignee: ELO TOUCH SOLUTIONS, INC., Milpitas, CA (US)

( * ) Notice: Subject to any disclaimer, the term of this patent is extended or adjusted under 35 U.S.C. 154(b) by 0 days.

(21) Appl. No.: 13/808,054

(22) PCT Filed: Sep. 27, 2012

(86) PCT No.: PCT/IB2012/002438
§ 371 (c)(1),
(2) Date: Jan. 2, 2013

(87) PCT Pub. No.: WO2013/046046
PCT Pub. Date: Apr. 4, 2013

(65) Prior Publication Data
US 2014/0055386 A1    Feb. 27, 2014

(30) Foreign Application Priority Data

Sep. 27, 2011   (EP) .................................. 11290442

(51) Int. Cl.
| | | |
|---|---|---|
| G06F 3/041 | (2006.01) | |
| G06F 3/0488 | (2013.01) | |
| G06F 1/16 | (2006.01) | |
| G06F 3/01 | (2006.01) | |

(52) U.S. Cl.
CPC ........... *G06F 3/0488* (2013.01); *G06F 1/1626* (2013.01); *G06F 1/1684* (2013.01); *G06F 3/017* (2013.01)

(58) Field of Classification Search
None
See application file for complete search history.

(56) References Cited

U.S. PATENT DOCUMENTS

| | | |
|---|---|---|
| 5,483,261 A | 1/1996 | Yasutake |
| 5,854,450 A | 12/1998 | Kent |
| 6,882,337 B2 | 4/2005 | Shetter |
| 8,947,463 B2 | 2/2015 | Miyazaki |
| 2003/0046087 A1 | 3/2003 | Johnston et al. |
| 2003/0048280 A1 | 3/2003 | Russell |

(Continued)

FOREIGN PATENT DOCUMENTS

| | | |
|---|---|---|
| CN | 101031869 | 9/2007 |
| DE | 102007039669 | 2/2009 |

(Continued)

OTHER PUBLICATIONS

International Search Report and Written Opinion for Application No. PCT/IB2012/002438, dated Jul. 9, 2013.

(Continued)

*Primary Examiner* — Nicholas Lee
(74) *Attorney, Agent, or Firm* — Sterne, Kessler, Goldstein & Fox PLLC (57) ABSTRACT

The invention relates to method for providing an input to a device characterized in that the input is based on a combination of at least one touch based interaction and at least one non-touch based interaction with the device, wherein the one type of input influences the action instructed to the device in response to the other type of input. The invention also relates to a corresponding device. To further improve the interaction between a user and a device, feedback providing means can be provided.

19 Claims, 8 Drawing Sheets

(56) References Cited

U.S. PATENT DOCUMENTS

| | | | |
|---|---|---|---|
| 2006/0026536 | A1 | 2/2006 | Hotelling et al. |
| 2006/0161870 | A1 | 7/2006 | Hotelling et al. |
| 2008/0168403 | A1 | 7/2008 | Westerman et al. |
| 2008/0246778 | A1 | 10/2008 | Ham et al. |
| 2008/0252613 | A1* | 10/2008 | Chuang .................. 345/174 |
| 2009/0116339 | A1 | 5/2009 | Ing |
| 2009/0167719 | A1 | 7/2009 | Wooley |
| 2009/0172606 | A1 | 7/2009 | Dunn et al. |
| 2009/0256809 | A1 | 10/2009 | Minor |
| 2010/0041431 | A1* | 2/2010 | Kim .................. G06F 1/1624 455/550.1 |
| 2010/0050133 | A1* | 2/2010 | Nishihara et al. .......... 715/863 |
| 2010/0053151 | A1* | 3/2010 | Marti et al. .................. 345/419 |
| 2010/0188353 | A1 | 7/2010 | Yoon et al. |
| 2010/0194692 | A1 | 8/2010 | Orr et al. |
| 2010/0271400 | A1 | 10/2010 | Suzuki et al. |
| 2010/0287470 | A1 | 11/2010 | Homma et al. |
| 2010/0328351 | A1 | 12/2010 | Tan |
| 2011/0074719 | A1 | 3/2011 | Yeh et al. |
| 2011/0102570 | A1 | 5/2011 | Wilf et al. |
| 2011/0179368 | A1* | 7/2011 | King et al. .................. 715/769 |
| 2014/0055385 | A1 | 2/2014 | Duheille |

FOREIGN PATENT DOCUMENTS

| | | |
|---|---|---|
| EP | 2161645 | 3/2010 |
| JP | 11-338120 | 12/1999 |
| JP | 2005-031799 | 2/2005 |
| JP | 2006-010489 | 1/2006 |
| JP | 2007-058540 A | 3/2007 |
| JP | 2009-527041 A | 7/2009 |
| JP | 2010-250492 | 11/2010 |
| JP | 2010-257037 A | 11/2010 |
| JP | 2010-262557 A | 11/2010 |
| JP | 2011-081749 | 4/2011 |
| TW | 200945174 A | 11/2009 |
| TW | 201020891 A | 6/2010 |
| TW | 201112074 A | 4/2011 |
| TW | M404551 U | 5/2011 |
| TW | 201128472 A | 8/2011 |
| WO | WO 2007/061057 A | 5/2007 |
| WO | WO-2007/093984 | 8/2007 |
| WO | WO-2008/136064 A1 | 11/2008 |
| WO | WO 2010/098050 A | 9/2010 |

OTHER PUBLICATIONS

Office Action for Japanese Application No. 2013-535583; dated Sep. 24, 2013.
Office Action for Japanese Application No. 2013-535584; dated Sep. 24, 2013.
International Search Report for Application No. PCT/IB2012/002438, dated Mar. 28, 2013.
International Preliminary Report on Patentability for Application No. PCT/IB2012/002334; dated Apr. 1, 2014.
International Preliminary Report on Patentability for Application No. PCT/IB2012/002438; dated Apr. 1, 2014.
International Search Report and Written Opinion for Application No. PCT/002334; dated Jul. 9, 2013.
Office Action for European Application No. 11 290 442.0; dated Mar. 21, 2014.
Office Action for European Application No. 11 290 443.8; dated Mar. 26, 2014.
European Search Report for Application No. 11290442.0; dated Jun. 21, 2012.
European Search Report for Application No. 11290443.8; dated Jun. 22, 2012.
Office Action directed to related Taiwanese Patent Application No. 101135737, with attached English-language translation, mailed Jul. 4, 2014; 15 pages.
Office Action directed to related Taiwanese Patent Application No. 101135738, with attached English-language translation, mailed Sep. 4, 2014; 17 pages.
Partial Search Report directed to related European Patent Application No. 11290442.0, mailed Jan. 31, 2012; 5 pages.
Partial Search Report directed to related European Patent Application No. 11290443.8, mailed Jan. 31, 2012; 5 pages.
English-language Abstract of Taiwanese Patent Application Publication No. 201020891 A; 1 page.
English-language Abstract of Taiwanese Patent Application Publication No. 201128472 A; 1 page.
English-language Abstract of Taiwanese Patent Application Publication No. M404551 U; 6 pages.
English-language abstract for Japanese Patent Application Publication No. 11-338120; 1 page.
English-language abstract for Japanese Patent Application Publication No. 2005-031799; 1 page.
English-language abstract for Japanese Patent Application Publication No. 2006-010489; 1 page.
English-language abstract for Japanese Patent Application Publication No. 2011-081749; 1 page.
English-language abstract for International Patent Application Publication No. 2007/061057 A1; 2 pages.
English-language abstract for International Patent Application Publication No. 2010/098050 A1; 2 pages.
"Asus Eee PC 900 flips one at MacBook Air with multi-touch input," The Register, Mar. 27, 2008 (accessible at http://www.reghardware.com/2008/03/27/asus_apes_air/); 4 pages.
"Combining Laser and Piezoelectric Touchscreens," IBM Technical Disclosure Bulletin, vol. 31, No. 2, International Business Machines Corporation, Jul. 1988; 1 page.
"How do you hold your Nokia," Microsoft Devices Blog, Jun. 28, 2010 (accessible at http://conversations.nokia.com/2010/06/28/how-do-you-hold-your-nokia/); 6 pages.
"Microsoft unveils pseudo-translucent display," DeviceGuru, Mar. 8, 2008 (accessible at http://deviceguru.com/microsoft-unveils-pseudo-translucent-display/); 5 pages.
Buxton, B., "Multitouch Systems I have Known and Loved," Jan. 12, 2007 (accessible at http://www.billbuxton.com/multitouchOverview.html); 23 pages.
Foehrenbach, et al., "Natural Interaction with Hand Gestures and Tactile Feedback for large, high-res Displays," MITH '08: Workshop on Multimodal Interaction Through Haptic Feedback; 7 pages.
Mossesgeld, R., "3D Touch Interfaces to Hit Smartphones Soon?", Tom's Guide, Mar. 26, 2010 (accessible at http://www.tomsguide.com/us/3d-touch-interface-stereoscopic,news-6263.html); 3 pages.
New, et al., "Facilitating User Interaction with Complex Systems via Hand Gesture Recognition," Proceedings of the 2003 Southeastern ACM Conference, 2003; 6 pages.
Subramanian, et al., "Haptic and Tactile Feedback in Directed Movements," University of Saskatchewan, 2005; 6 pages.
Sunshine, J., "2D, 3D and Multi-Touch Gestures Made Easier," Carnegie Mellon University, PowerPoint Presentation, 2009; 26 pages.
Turk, M., "Chapter 10. Gesture Recognition," Microsoft Research; 25 pages.
Williamson, et al., "Audio feedback for gesture recognition," Technical Report TR-2002-127, Department of Computing Science, University of Glasgow, Dec. 20, 2002; 15 pages.
Elepfandt, et al., "Multimodal, Touchless Interaction in Spatial Augmented Reality Enviornments," in Digital Human Modeling, V.G. Duffy (ed.), Berlin: Springer-Verlag, 2011; pp. 263-271.
Althoff, et al., "Robust Multimodal Hand- and Head Gesture Recognition for controlling Automotive Infotainment Systems," VDI-Berichte, Jan. 1, 2005; 10 pages.

* cited by examiner

TOUCH AND NON TOUCH BASED INTERACTION OF A USER WITH A DEVICE

The invention relates to a method for providing a gesture-based input to a device and the corresponding device.

More and more electronic devices allow a gesture-based interaction with a user. Touch-sensitive interfaces, for instance single or multitouch sensitive touch screens, are capable of sensing the trajectory of a gesture carried out by a user touching the interface using his hand or one or more fingers thereof. Based on the spatial and/or temporal properties of the trajectory, a corresponding instruction is input to a processing unit of the electronic which then carries out the corresponding action. For instance, a linear trajectory from the right to the left is interpreted as a swipe or flick gesture used to move an object on a screen from the right to the left or to change from one page illustrated on the screen to a next one. Another popular example is the zoom-in gesture to enlarge an object on a display when the touch-sensitive interface senses the presence of two fingers moving apart from each other.

Recently, electronic devices with a gesture based input capability have been proposed that do not need a direct contact by the user with a touch sensitive interaction surface of the device as gestures simply realized by the user in front of the device are sensed using a camera and based on image analysis carried out within the device, the properties of such a 3D gesture are analyzed.

With gesture based interaction patterns a more natural way of interaction can be achieved between a user and an electronic device, improvements are still necessary as the interaction means of such electronic devices still forces a certain type of interaction pattern which might not necessarily correspond to a natural or intuitive way of interacting with the device.

It is therefore the object of this invention to provide a method for interacting with a device based on gestures which is even more flexible and allows adaption of interaction patterns to more natural interaction schemes.

This object is achieved with the method according to claim 1. The method for interacting with a device to provide an input to the device is characterized in that the interaction is based on a combination of at least one touch based interaction and at least one non-touch based interaction with the device, wherein the one type of interaction influences the input attributed to the interaction with the device in response to the other type of interaction. Thus the effect of a touch based interaction on the action carried out by the device in respect to the interaction becomes dependent on another type of interaction, e.g. the same type of touch based interaction will lead to two different actions carried out by the device if the non-touch based interaction is different. Thereby, the response of the device to a certain interaction can be adapted to particular circumstances thus rendering the interaction with the device more flexible and more intuitive.

In this context the term "touch based" relates to any kind of interaction between a user and a device during which the user physically touches the device. A touch based interaction may relate to touching a predetermined area of the device, sliding over the surface of the device, or simply by holding the device. The touch can be a single touch event, e.g. by the user's finger or a stylus or a multi touch event, during which more than one finger touches the device.

In this context the term "non-touch based" relates to any kind of interaction between a user and the device that does not need a physical contact between the user and the device.

The term "input" in the context of the invention, relates to any kind of instructions that can be identified by the device to carry out predetermined tasks or actions.

Preferably, the method can provide a gesture-based interaction with a device and can be characterised in that the interaction is based on a sequence of at least one gesture based interaction without touching the device and at least one touch based interaction during which the user touches the device, wherein at least one realization characteristic, in particular trajectory and/or speed and/or duration in time and/or pressure, of the one interaction influences the input attributed to the interaction with the device.

In this context the term "gesture" relates to any form of non-verbal interaction with the device in which visible bodily actions communicate particular messages.

Thus a device touching interaction, e.g. a one or two dimensional gesture realized on a touch sensitive interaction surface, is combined with a non-touch based gesture, which can be a three dimensional gesture carried out by the fingers, the hands or arms of the user, so that a user without having to adapt to the device can copy actions he is used to in the real world when interacting with the device. By influencing the one interaction using parameters based on the characteristics of the other interaction, the interaction becomes more flexible and at the same time more intuitive. As one example, an object pick-up and replace action can be carried out by grabbing an object on the surface of the device, thus touching the device, and moving it to another location on the device without having to continuously touch the device itself. Thus, the flexibility concerning interactions with the device can be enhanced. Without the grabbing action, a moving non-touching gesture would not have led to the same result.

According to a variant, the non-touch based interaction, e.g. a gesture, and the touch based interaction can occur one after the other or alternate. This allows a user to realize real life patterns such as the abovementioned pick up and translate action.

Preferably, the at least one non touch based interaction, in particular gestures, and the at least one touch based interaction can overlap at least partially in time. Thus, more complex interaction patterns can be enabled in case one combines touch based and non-touch based interaction schemes compared to the art. For instance, in case a user wants to rotate an object illustrated on a display, the user can select a rotation axis by touching the device and, with the other hand, realize a flick or sweep gesture instructing the rotation around the desired rotation axis.

Advantageously, the interaction during which the user touches the device can occur on at least one of the frontside, the backside or a side wall of the device. By not limiting the interactive sensitive region of a device to the frontside (being defined as the side usually facing the user), the user, in carrying out his interactions with the device, is not forced to interact via this one side but can freely choose how he wishes to interact with the device.

Advantageously, the interaction during which the user touches the device can activate at least one of a key-based input, a computer mouse-based input, a track ball or a touch or multitouch-based input. The provision of one or more of interaction technologies further enhances the flexibility of the interaction patterns.

According to a preferred embodiment, a non-touch based gesture can be sensed using one or more camera means incorporated in the device and/or one or more remote control units comprising at least one of an accelerometer, a gyroscope, an ultrasound sensing means etc. These elements allow the sensing of non-touch based gestures in a stable and reliable way.

Ultrasound can be used to sense both touch and non-touch based interactions, however dedicated sensing means and algorithms are needed for both types of interaction.

Advantageously, the sequence of interactions can comprise: a) a registration phase for initiating an input to the device, b) a continuation phase for providing the input to the device, and c) a termination phase for confirming the input to the device. During the registration phase, the device will inform the user that it is capable of receiving inputs of the user to thereby increase the user friendliness of the system while the user uses the termination phase to confirm his input so that spurious inputs to the device can be prevented.

Preferably, in step c) a touch based interaction can be used to confirm an input provided in step b) via a non-touch based interaction, e.g. a gesture realized by the user without touching the device. The touch based confirmation interaction improves the prevention of spurious inputs due to unintentional non-touch based interactions, like gestures within the predetermined volume around the device in which the non-touch based interactions can be sensed by the device.

Advantageously, the method can be used for selecting an object and providing an instruction to the device in relation to the selected object by realizing a sequence of steps comprising: d) selecting the object using a touch based interaction, like a gesture, and e) providing an input in relation to the selected object based on a non-touch based interaction, like a gesture. Like in a real life situation, one thus should touch the object to select it before providing an input which might be more natural to carry out in real life.

The method as descried above is particularly advantageous to provide an input to move an object from a first position to a different position comprising the sequence of gestures of: f) sensing a pinch or squeeze or rotation gesture provided by a user touching the device at a first position, g) sensing a translating gesture not touching the device, and h) sensing a release gesture by either a touch based or non-touch based gesture at or above a second position. For instance, an icon could be moved from a first position on a screen to a second position or even an object shown on the screen could be picked up on the screen and moved beyond the screen onto a functional area outside the screen. Upon identification of the second position where the object is dropped, the action attributed to the functional area outside the screen, e.g. printing, deleting etc. can be carried out.

During a pinch or squeeze gesture, a touch based user interaction means of the device is configured to identify two or more objects, e.g. finger tips present on the interaction surface which move closer to each other, whereas, the release gesture, during which touching occurs, corresponds to the inverse movement. In case of a rotation gesture one object turns around a second immobile object or both objects describe a curved trajectory. For the non-touch based gestures, sensed by a non-touch based user interaction means, a translating gesture corresponds to a gesture during which the coordinates change in time. The release non-touch based gesture corresponds to sensing and identifying at least two elements, such as fingers, that move apart from each other or a rotation in the opposite direction. With the inventive method for inputting an instruction to move an object on a screen to a different position, a natural way of interacting with a device is enabled.

According to another advantageous use, the method as described above can comprise the steps of i) sensing a touch-based interaction, j) in response to the touch-based interaction, setting a parameter, k) sensing at the same time a non-touch based gesture, and l) in response to the non-touch based gesture and the parameter set, instructing a corresponding action to the device. In this method, both a non-touch based gesture and a touch based gesture occur at the same time wherein the parameter set by the touch-based gesture enhances the flexibility of the instruction inputting patterns. For instance, this method is suitable to define a rotation axis by touching the device whereas a swipe or flick gesture with the other hand of a user will start the rotation of the object around that defined axis. In this context a swipe like gesture relates to an essential linear trajectory, wherein a flick gesture corresponds to a swipe gesture being carried out faster than a certain threshold. Instructions input to the device can be different for a swipe and a flick gesture.

The object of the invention is also achieved independently of the methods already described above by the method for providing a gesture-based input to a device according to claim 11.

The method according to claim 11 is a method for providing a gesture-based input to a device which optionally could be combined with any one of the methods as described above, comprising the steps of sensing a gesture, classifying the gesture and, depending on the classification, inputting an instruction to the device, wherein the instruction depends on the realization characteristics of the gesture, in particular trajectory and or speed and/or duration in time of the gesture, and scales with at least one parameter independent of the gesture.

Preferably, the parameter can be at least one of a parameter of the device and/or a parameter of an object presented on a display of the device and/or the distance between the object making or realizing the gesture and the device.

For instance, gestures can range from smaller to larger sized gestures and/or shorter and longer sized gestures dependent on both the size of the physical device and/or the size of the object on a display of the device. Preferably, the at least one parameter can thus be size in one, two or three dimensions of the device or the object. Depending on the size of an object illustrated on a screen of a device, the scaling of the gesture can thus be adapted accordingly.

Preferably, the scaling between the realization characteristics of the gesture and the at least one parameter can be directly proportional to provide the same instruction. Thus, as an example, to move a small object from one side of a screen to the other, only a short non-touch based gesture is necessary, whereas, for a larger object, to achieve the same result, the gesture can be larger by being a longer non-touch based gesture. As another example, a user realizing a small gesture with his finger, e.g. a swipe, close to the device can provide a larger gesture, e.g. a swipe with his hand, if he wants to provide the same input when carrying out the gesture from a more distant location from the device.

The inventive scaling method of a gesture by a parameter is not only limited to objects illustrated on a screen of a device, but can be extended to the device itself. When incorporating a non-touch based interaction means into an electronic device, the interaction means according to a specific embodiment of the invention is configured to take into account the physical size of the device to define the scaling of the input gestures. Thus, for a small hand-held type device, e.g. a smart phone, or for a larger device, e.g. an E-book, the gestures necessary to carry out the same action may be adapted in size to the size of the devices.

According to a preferred embodiment, the at least one non-touch based interaction can be based on an environmental parameter, in particular in relation to luminosity, an electric field, a magnetic field, electromagnetic radiation, pressure, temperature, humidity, vibrations. Thus not only non-touch based gestures, like 3D gestures, can influence the input attributed to the interaction with the device in response to a touch based interaction, but also an environmental parameter sensed by a corresponding sensing means of the device.

For instance, in case the sensing means identifies that the device is positioned in the dark, any non-touch based interaction with the device will lead to illuminating a screen of the device or the backlight of the keyboard before allowing a further input; whereas in case the sensing means identifies that the device is positioned in a bright environment, the same input to the device can provoke a different action, e.g. hitting a key will immediately display the corresponding letter on the screen.

The invention also relates to a computer program product, comprising one or more computer-readable media having computer executable instructions for performing the steps of the methods described.

The object of the invention is also achieved with the device comprising at least one touch based user interaction means and at least one non-touch based user interaction means, configured for carrying out one or a combination of the methods as described above. The device enables a more natural interaction between the user and the device as gestures can be applied by the user which correspond to real life actions, such as pick up and replace action.

Preferably, the device can comprise at least one touch based user interaction means and at least one non-touch based user interaction means, wherein the non-touch based user interaction means is configured to sense a non-touch based interaction, in particular a gesture, within a predetermined volume around the device, and at least one feedback providing means configured to output a first visual and/or acoustic output when an object, in particular a hand of a user, enters into the predetermined volume. Thus, the user will immediately recognize whether the device is ready to accept inputs even in the absence of a touch.

Preferably, the device might be configured such that the first feedback is only provided in case the user touches a predetermined area of the device with the other hand Thus, an unintentional input to the device can be prevented.

Advantageously, the feedback providing means can be configured to output a second visual and/or acoustic and/or haptic output, in particular different to the first output, when the object is inside the predetermined volume and/or touches the device. Thus, after the registration phase when the user enters the predetermined volume, the second feedback output informs the user that the device is accepting gestures. This phase is also called Interaction Continuation Phase. Thus, the user friendliness is further improved.

Advantageously, the feedback providing means can be further configured to output the second output as long as an interaction, in particular a gesture, is sensed by the touch based user interaction and/or the non-touch based user interaction means. Thus, at any time, the user will be informed of the fact that the device is still registering a gesture.

According to an advantageous embodiment, the feedback providing means can be configured to output a third visual and/or acoustic and/or haptic output, in particular different to the first and/or second output, when the interaction is terminated and/or when the device is switched off or put in idle state. Thus, the user receives a termination feedback signal from the device upon successful termination of the interaction. The termination feedback might also be output, in case the object leaves the predetermined volume around the device. Thus the user will know that the device no longer accepts inputs.

Preferably, the device can comprise a display on its frontside, and the feedback providing means is configured such that a visual indication is provided on the display in case an object is present in the predetermined volume on the backside of the device. In this respect, the frontside is the side of the device which is facing the user in normal use whereas the backside is the opposite side of the device facing away from the user.

Thus, a user trying to provide an input via an interaction via the backside of the device, e.g. during a non-touch based gesture or a touch based gesture provided on a touch-sensitive interaction means provided on the backside, will know at any time that the device is ready to accept the input from the user. This further enhances the user friendliness of the device.

According to a preferred embodiment, the device can be a hand-held or a portable electronic device. Examples are a mobile phone, a smart phone, a navigator, an e-book, an audio and/or video player, a portable computer, etc. The invention is particular advantageous for small devices where the interaction areas are limited and usually no larger than 200 cm$^2$.

In the following, a detailed description of particular embodiments of the invention will be explained in detail with reference to the accompanying figures.

Figure 1:
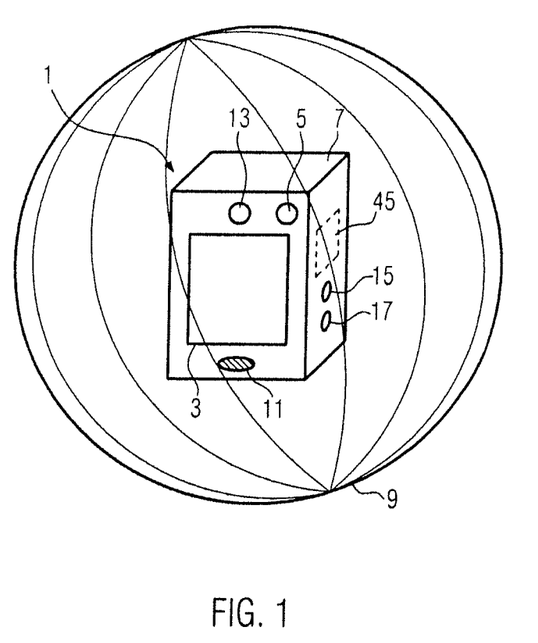
FIG. 1 illustrates a first embodiment of the invention relating to an electronic device comprising touch based user interaction means and non-touch based user interaction means, FIG. 2a schematically illustrates a method for providing a gesture-based input to a device according to second and third embodiments.

FIG. 1 illustrates a device according to a first embodiment of the invention. The electronic device comprises a first touch based user interaction means 3 and a second non-touch based user interaction means 5.

According to various embodiments, the touch based user interaction means 3 can be any one of a key-based interaction means, a mouse or drag pad/drag ball based interaction means or a touch or multitouch-based touch-sensitive interaction surface. In a specific embodiment, the touch based user interaction means 3 is preferably a multitouch sensitive interaction surface. In FIG. 1, only one touch-sensitive interaction means 3 is visible, however, according to further variants of the inventive device 1, the backside of the housing 7 of the device 1 and/or the side wall of the housing 7 also may comprise additional touch-based interaction means. The touch-sensitive interaction means 3 may comprise a touchscreen or touchpad utilizing for example, capacitive, surface acoustic wave, acoustic pulse recognition or other touch technology, or may comprise part of the device's housing that is enabled to be touch sensitive such as preferably using acoustic pulse recognition touch technology.

The non-touch based interaction means 5 in this embodiment is a camera positioned next to the user interaction means 3. As for the touch based user interaction means 3, further non-contact interaction means might be present on the backside and/or the side walls of the housing 7.

The electronic device 1 can be any one of a hand-held or portable device, such as a telephone, a smart phone, an E-book, a navigation device, an audio and/or video playing device, a personal computer, a gaming console etc. The inventive concept could, however, also be incorporated into other types of electronic devices.

The non-touch based user interaction means 5, such as the camera, is configured such that user gestures made or realised by a user, for instance with the user's hand or fingers, within a predetermined volume 9, here illustrated as a sphere around the device 1, can be sensed, analyzed and classified. For instance, image analyzing means are provided within the electronic device 1 to analyze the images taken by the camera 5 to identify the movement of the hand or the fingers of the user so that, from the properties of the gesture the corresponding input pattern can be identified so that a processing unit within device 1 can receive instructions from the non-touch based user interaction means 5. Properties of the gesture, or the gesture realization characteristics, could comprise any one or a combination of extension in space or trajectory, duration in time, relative movement of fingers, etc.

In a comparable way, the touch based user interaction means 3 is configured such that an input, for instance a gesture on the user interaction means 3, is sensed, analyzed and classified to identify the corresponding instruction the user wanted to provide.

In addition to the touch based user interaction means 3, device 1 may comprise additional features as known in the art, for instance a microphone 11, a loud speaker 13, connecting interfaces e.g. for charging and communicating with other devices 15, 17 or keys or even a full or restricted keyboard. In addition, the device 1 could comprise wireless communication means.

In FIG. 1, the predetermined volume 9 within which the non-touch based user interaction means is capable of identifying user gestures has been shown as a sphere around the device. Of course, this predetermined volume 9 may have any shape around device 1.

Instead of using a camera or camera as the interaction means 5, any other suitable non-touch based user interaction means capable of identifying gestures, for instance remote controls using accelerometers or gyroscope, or ultrasound sensing means etc., could be used.

Compared to prior art devices, the electronic device 1 according to the invention allows a user to provide input to the device based on the combination of touch based and non-touch based interaction patterns. This has the advantage that gestures carried out in the real world can be copied when realising comparable actions when interacting with an electronic device. Thus, a more natural and intuitive way of interacting with the device is enabled. This will be explained in detail in relation to the embodiments of the invention.

Figure 2A:
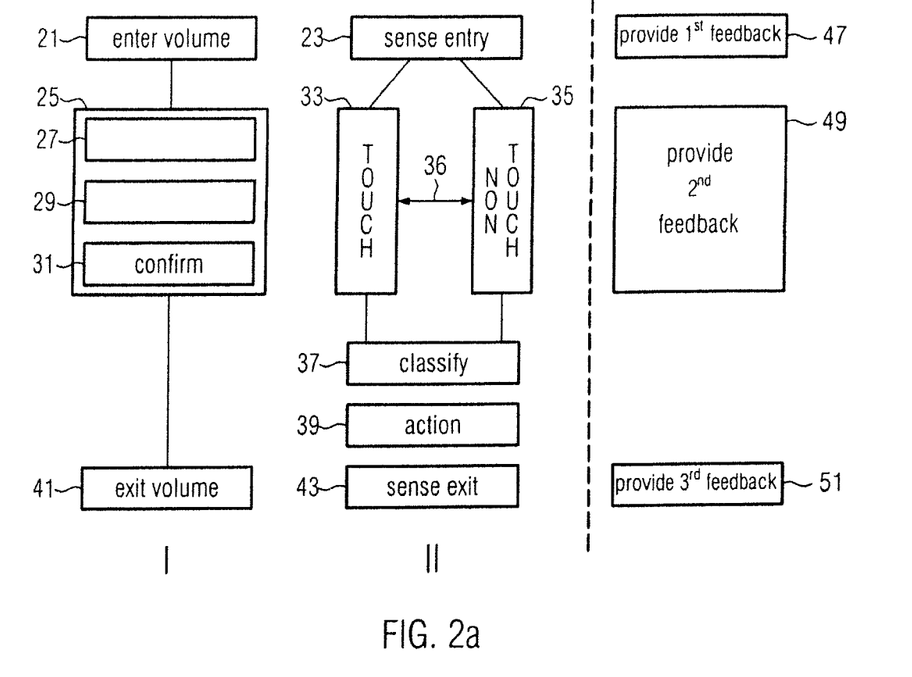

FIG. 2a illustrates a second and third embodiment of the invention relating to a method for providing input to an electronic device, such as electronic device 1 illustrated in FIG. 1.

Columns I and II of FIG. 2a relate to the second embodiment, columns I to III to the third embodiment of the invention.

Column I illustrates the activities of a user, whereas column II illustrates the reaction of the electronic device 1 according to the invention.

When a user enters the predetermined volume 9 with one of his hands and/or fingers and/or with an object he carries in his hand (step 21), the non-touch based interaction means 5 will sense the entry into the predetermined volume 9 and provides the corresponding output to the processing unit of electronic device 1 (step 23).

After this registration phase, the user continues to interact with the device 1 and provides an input 25 which might comprise a plurality of sub-gestures 27, 29, 31 being a combination of non-touch based gestures sensed by the non-touch based user interaction means 5 and touch based gestures, e.g. the sliding of a finger on the touch-sensitive interface, sensed by the touch based user interaction means 3, to initiate certain actions in the electronic device 1. During this gesture inputting or continuation phase, the user interaction means 5 and 3 sense the user's gestures or sub-gestures in step 33 concerning touch based interactions and step 35 concerning non-touch based interactions, and analyze the sensed data to classify the gesture and/or sub gestures to identify the input corresponding to the user's interaction pattern (step 37). Having identified the corresponding actions, the processing unit receives the instructions to carry out the desired activities (step 39).

According to the invention the step of identifying the action corresponding to the user's interaction pattern will depend on the relation 36 between the sensed non-touch based interactions 35 and the sensed touch based interactions 33. Indeed, depending on how the one type of interaction is carried out the input attributed to the other type of interaction will be adapted.

The touch based user interactions could also relate to the hitting of keys on the housing 7 of the device 1.

When the user's fingers or hand or the object carried by the user exits the predetermined volume 9 in step 41, the interaction is terminated which is sensed by the non-touch based user interaction means 5 (step 43).

It should be noted that the size of volume 9 to determine entry (steps 21, 23) may be different and/or user-configurable according to some embodiments than the size of volume 9 used to determine exit (steps 41, 43).

Thus, electronic device 1 is configured such that non-touch based and touch based interactions carried out one after the other or in parallel can be provided to the device 1 and such that both types of interactions influence each other. This allows more flexibility in the user interaction patterns so that a more natural and intuitive way of interacting with the device is enabled.

In addition to the steps already described with respect to the second embodiment, which are also part of the third embodiment, the third embodiment according to the invention comprises a feedback mechanism. The feedback mechanism is schematically illustrated in column III and, preferably at any time, is configured to inform the user about the fact that the device 1 is accepting user inputs. The feedback providing means configured to realize the feedback mechanism can be incorporated in the device as illustrated in FIG.

1. The feedback providing means carries the reference numeral 45 and is indicated in dotted lines.

In detail, upon entry of the object into the predetermined volume 9 (steps 21 and 23) the feedback providing means 45 (see reference numeral 45 in dotted lines in FIG. 1) is configured such that a visual and/or acoustic feedback signal is output. For instance, the loud speaker 13 could output a signal representative of the fact that the device 1 has sensed that the user has entered into the predetermined sphere 9. At the same time, or as an alternative, a visual icon or signal, a blinking LED or the like, may indicate this state. Thus the user will know that the device 1 has recognised that the user entered the predetermined volume 9 so that gestures provided by the user can be sensed and identified by the device (step 47).

According to a variant, the first feedback output 47 is only provided by the electronic device in case a predetermined condition is satisfied. For instance, feedback is only provided if the user holds the device with the other hand and pushes a certain button indicating that a user input is intended. Alternatively the touch sensing means 3 could also identify the fact that the user holds the device. With this additional feature, an unintended gesture-based input to the device 1 can be prevented.

Next, during the continuation phase, the feedback providing means 45 is configured such that a second visual and/or acoustic signal, typically different to the first one, is output by the device 1 (step 49). The second feedback output 49 can either be provided during the presence of the object carrying out the gesture within the predetermined volume 9 or only during recognition of a gesture so that the user at any time either knows that gestures can be input or that currently the device has sensed the movement a user is realizing or making within the predetermined volume 9.

In case that a touch based gesture is input, the visual and/or acoustic feedback signal provided by the feedback providing means 45 can be accompanied or replaced by a haptic, e.g. a vibrating feedback signal, again informing the user that a device is currently sensing an input (step 49).

Finally, upon completion of the input, and while the user leaves the predetermined volume 9, the feedback providing means 45 is configured to output a third signal, visual and/or acoustic, to inform the user that now he has left the predetermined volume 9 within which he can provide inputs to the device 1. The third output 51 is preferably different to the first and/or the second output(s).

Thus, at any time during the course of the interaction with the device, the user knows about the fact that the device 1 is accepting gestures, the fact that interactions, like gestures are sensed and that he has left intentionally or unintentionally the predetermined volume 9.

This feedback providing mechanism 45 is preferably realised together with a device that combines non-touch based interaction means 5 and touch based interaction means 3 like illustrated in device 1, but can also find its inventive application in case only one type of interaction means is present.

Figure 2B:
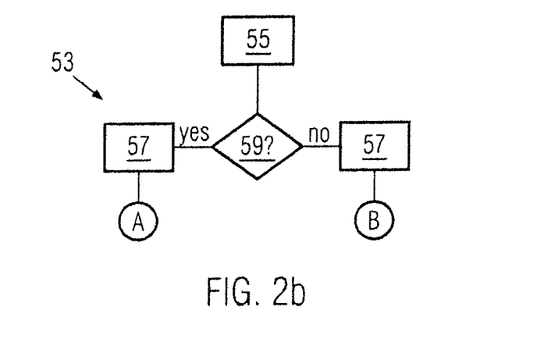
FIG. 2b illustrates a sequence of sub interactions forming an input in which an interaction of the first type is confirmed by an interaction of the second type.

FIG. 2b illustrates an input providing interaction 53 comprising a sequence of sub-interactions 55 and 57 according to a variant of the input 25 used in the second and third embodiment and illustrated in FIG. 2a. In this example interaction 55 relates to a non-touch based interaction, like a gesture provided by the user and the interaction 57 relates to a touch based interaction on the user interaction means 3, which again could also relate to a certain key stroke on a keyboard of device 1.

To prevent unintentional inputs to the device 1, the analyzing step in step 35 illustrated in FIG. 2a first checks whether a confirmation or termination action 59 has been provided by the user, wherein the termination action 59 preferably corresponds to a touch based interaction, which can be sensed in step 33. The termination action 59 can for instance be a certain key on the housing of the device 1 or a simple touch of the interaction means 3.

In case the confirmation interaction 59 has been provided by the user subsequent to the non-touch based gesture 55 and, in addition, a touch based interaction 57 is sensed, input A is instructed in step 39 whereas in the absence of the confirmation interaction 59, input B is instructed in step 39.

Figure 3:
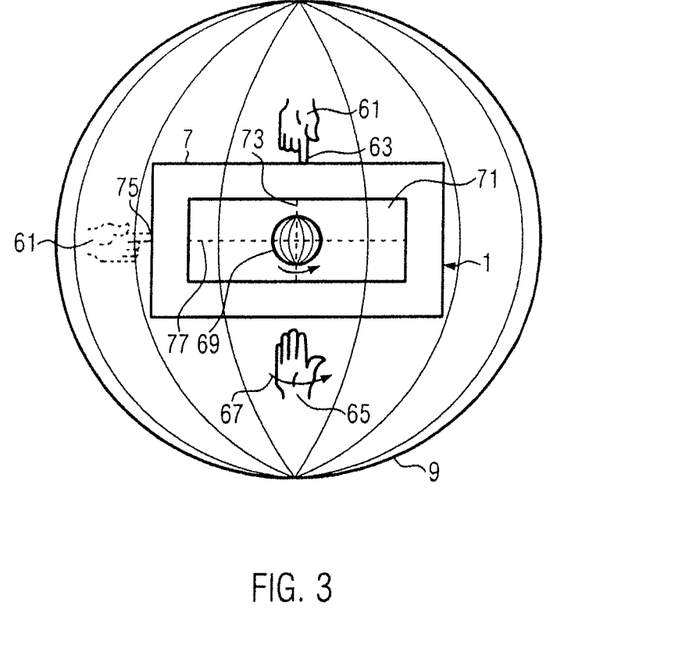
FIG. 3 illustrates a first practical example of a use of the inventive method for providing a gesture-based input.

FIG. 3 illustrates a first inventive use of the method according to the second or third embodiment illustrated in FIG. 2a and that can be realised with the electronic device 1 as illustrated in FIG. 1.

In this inventive embodiment, a touch-based interaction and a non-touch-based interaction, here a gesture, are carried out at the same time to provide input to the electronic device 1. Whereas the user touches the device 1 with one hand 61 at a certain location 63, which can be sensed by the touch based user interaction means of the electronic device 1, the user's second hand 65, not touching the device 1, but positioned within the predetermined volume 9, carries out a gesture, here a flick or swipe movement 67, at the same time.

In this embodiment, the touch-based interaction at location 63 on top of the housing 7 of device 1 is used to identify a rotation axis 73 of an object 69 illustrated on a screen 71 of device 1, wherein the flick or swipe gesture realized by the second hand 65 initiates a rotation of object 69 around the axis 73. By positioning his hand at location 75, illustrated by dotted lines on FIG. 3, a new rotation around axis 77 can be initiated. Thus the touch based interaction influences the action carried out by the device in response to the non-touch based interaction.

This embodiment only illustrates one example of the advantageous use of a combination of a touch based interaction and a non-touch based interaction with an electronic device 1 to realise complex input patterns. But still, the interaction with the device may remain natural and intuitive.

Figure 4A:
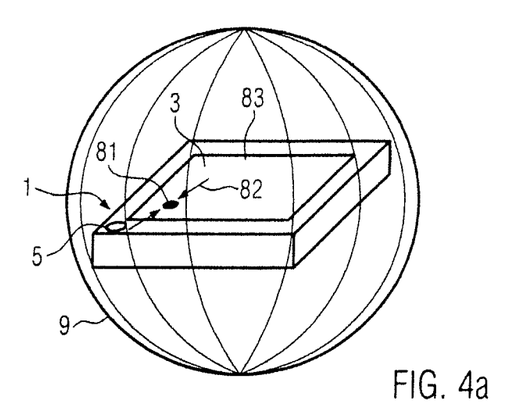
FIGS. 4a-4c illustrate a second example of a use of the inventive method for providing a gesture-based input to a device.
Figure 4B:
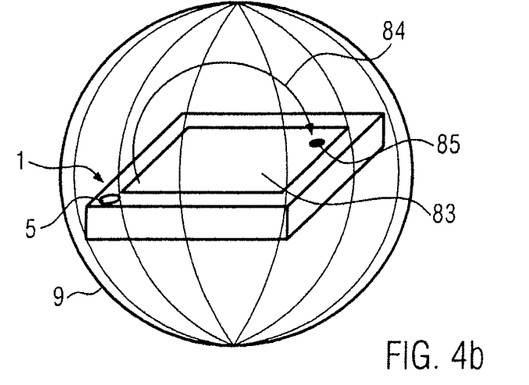
Figure 4C:
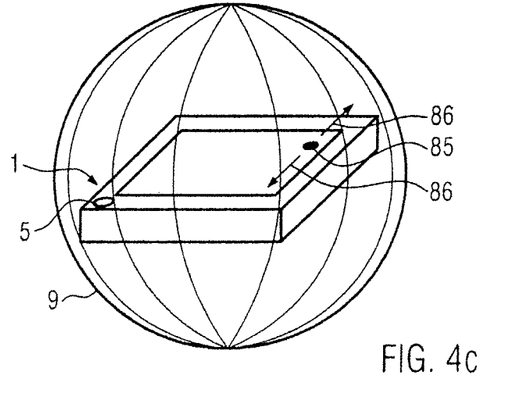

FIGS. 4a to 4c illustrate a second inventive use of the device according to the first embodiment and the method according to the second or third embodiment of the invention as illustrated in FIGS. 1 and 2. FIGS. 4a to 4c illustrate an interaction between the user and the device 1 during which a touch based user interaction and a non-touch based user interaction follow each other.

After having entered the predetermined volume 9, the user approaches an object 81 presented on a screen 83 of the device 1 and, by carrying out a pinch or squeeze gesture during which two or more fingers move closer to each other, indicated by arrows 82 while touching the touch based user interaction means 3, the touch based user interaction means 3 having sensed the pinch gesture will instruct the processing unit of electronic device 1 to select object 81, e.g. the icon of a file, and to await further instructions concerning the selected object 81. As an alternative the user could also carry out a rotation gesture to pick up the object 81.

FIG. 4b illustrates the second step of the interaction sequence according to this inventive use of the method. After the selection step, the user picks up object 81 while keeping his fingers together and moves away from the interaction surface, indicated by arrow 84, just like one would do with a real life object. The gesture continues in translating the picked up object 81 towards a second position 85 on display 83. During the movement of the user's hand within volume 9, the non-touch based user interaction means 5, as illustrated and described with respect to FIG. 1, will sense the translation gesture, for instance by analyzing a plurality of subsequent images in which the position of the hand of the user changes from image to image, and instruct the processing unit of device 1 accordingly. During the non-touch based translation gesture, the device 1 could be configured to display the projection of the user's hand together with the object on the display. The translational movement is similar to the swipe gesture in the first use according to the invention illustrated in FIG. 3. Here, however, the swipe gesture is influenced by the gesture carried out during the contacting phase, so that the corresponding action leads to a repositioning instead of rotation of the object as in the first example according to the invention.

Then, finally, to reposition object 81 at the second position 85, the user opens his fingers, indicated by arrows 86 to release the picked up object, as illustrated in FIG. 4c, or makes a rotation gesture in the opposite way compared to the pick up step. The corresponding gesture could be a non-touch based gesture away from the interaction surface 3, but within the predetermined volume 9 sensed by the non-touch based interaction means 5 or a touch based release gesture on the touch based user interaction means 3.

In this example of a practical use of the inventive method, an activity that the user usually carries out in real life when he wants to pick up and replace an object can be carried out with respect to the object 81 illustrated in FIGS. 4a-4c. Thus, compared to an interaction scheme where the user is forced to carry out all gestures on the screen, the interaction is more natural and more intuitive, thus more user friendly.

Instead of moving an object 81 from the first position on the display 83 to another position 85 on the display, it could also be moved beyond the display area somewhere else onto a functional area on the housing 7 of device 1. The non-touch based user interaction means 5 is capable of identifying where the user releases the object 81 and if it is identified that the second position corresponds to a functional area then the action attributed to this functional area outside the touchscreen, e.g. printing of a file, deleting the file, sending the file over a network etc. can be initiated by the processing unit.

The pick and replace action as illustrated in FIGS. 4a-4c using a sequence of touch and non-touch based interactions, here gestures, is only one practical example to interact with the electronic device, other interaction patterns combining touch and non-touch based gestures can be realized without departing from the scope of the invention.

Figure 5A:
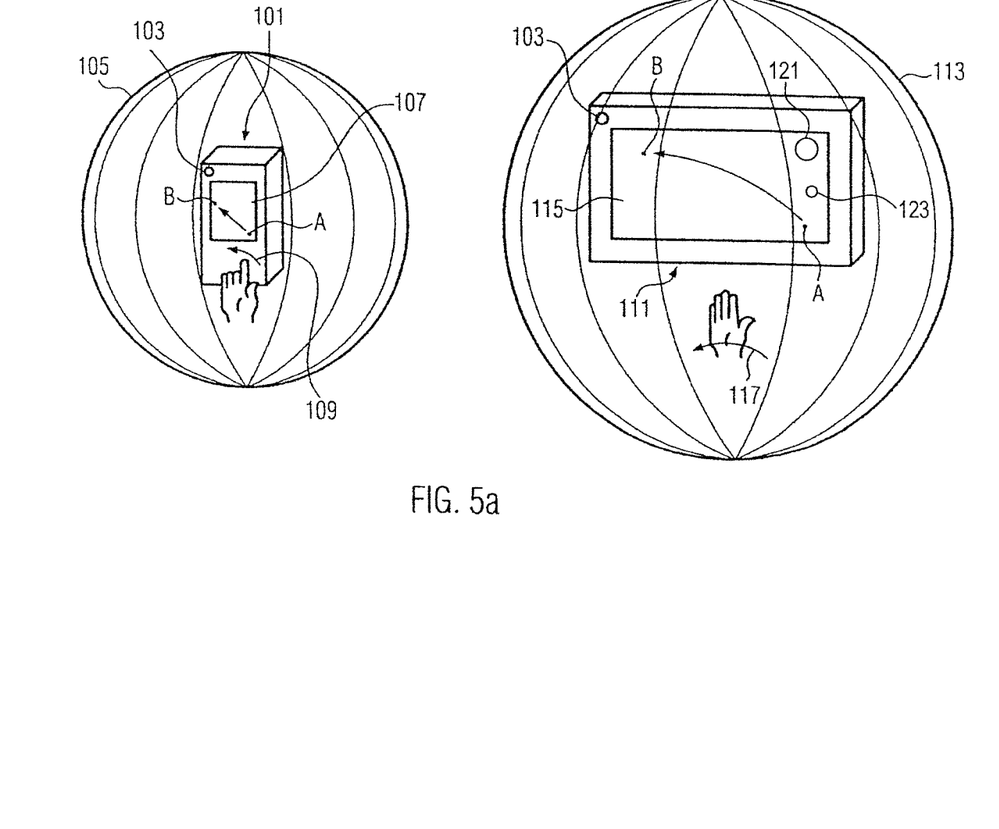
FIG. 5a illustrates a fourth embodiment of the invention relating to the scaling gestures according to a parameter.

FIG. 5a illustrates a fourth embodiment of the invention which can be combined with any one of the first to third embodiments. The left side of FIG. 5a illustrates a smaller electronic device 101, for instance, a mobile telephone with a non-touch based interaction means 103 and a predetermined space or volume 105 within which the non-touch based interaction means 103 is capable of sensing gestures provided by a user. In this respect, the non-touch based interaction means 103 is comparable to interaction means 5 as used in device 1 and illustrated in FIG. 1.

On the right hand side of FIG. 5a a larger electronic device 111, for instance, a laptop computer or an e-book, is illustrated. The larger electronic device 111 also comprises a non-touch based interaction means 103, which is the same as in the smaller device 101. The non-touch based interaction means 103, accepts user gestures within a predetermined volume 113 around the larger electronic device 111. Here the predetermined volume 113 is larger than the volume 105 of the smaller device.

According to the invention, depending on whether the interaction means 103 is incorporated into the smaller or larger electronic device 105 and 113, the parameters, like size of the trajectory and duration, of a gesture necessary to carry out a predetermined task, like moving an object from one side A to the other side B on a screen 107 and 115, scales with the size, for instance, the width, the diagonal, the surface area or the volume of the device 101 or 111 to allow a more intuitive user interaction device. Thus, the larger the size of the device the larger is the gesture necessary to provide input.

The gesture 117, here illustrated as an arrow to the right, carried out by the user in the larger device is larger compared to the gesture 109 carried out in the case of the smaller device. For instance, to move an object from A to B on the displays a finger swipe is sufficient for the smaller device 101, whereas for the larger device 111, a swipe with the entire hand could be used to move the object from position A to position B.

By scaling the size of the trajectory and/or time duration of the non-touch based gesture with a physical parameter of the device itself, an automatic adaptation based on scale can be achieved. The gesture analyzing unit of the non-touch based user interaction means is configured to adapt its gesture analyzing as a function of a predetermined parameter relating e.g. to the size of the device.

According to a variant of the fourth embodiment, the gestures may not only scale with the physical dimensions of a device, like illustrated in FIG. 5a, but also scale with the dimensions of objects presented on the display. Here a larger object 121 and a smaller object 123 are illustrated on screen 115 of the larger electronic device 111. To move the larger object 121, a user would expect that a larger gesture is necessary, whereas for the smaller object 123, the user would expect a smaller gesture. For instance, with the smaller object a finger swipe could be sufficient whereas a hand swipe could be used to achieve the same result with the larger object 121. Again the gesture analyzing unit also can be configured to take into account parameters of the objects presented on a display of the device.

Figure 5B:
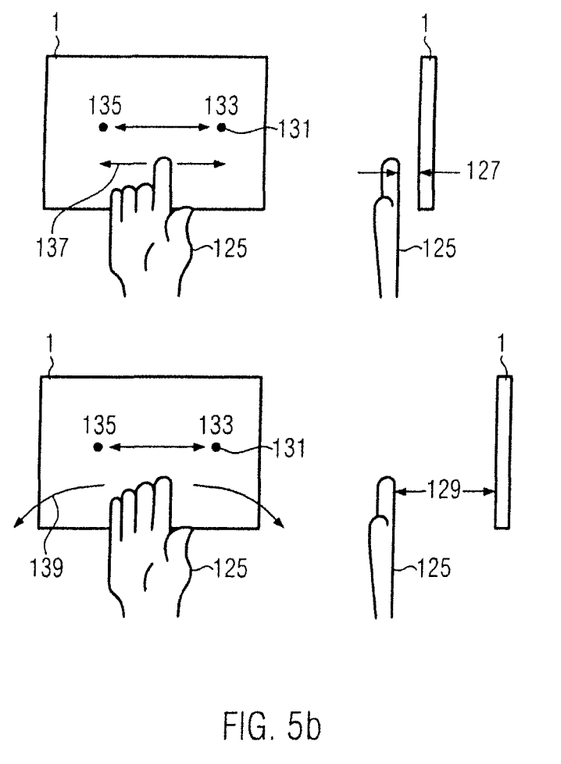
FIG. 5b illustrates a variant of the fourth embodiment.

FIG. 5b illustrates a variant of the scaling concept. In this variant the gesture scales with the distance of the object 125, here a user's hand, from the device 1. In the upper part of FIG. 5b, the hand 125 is close to the device 1. The left part of the figure shows the hand 125 in front of the device 1 and the right part shows a side view, illustrating the distance 127 between the hand and the device 1. In the lower part of FIG. 5b, the hand 125 is further away (distance 129) from device 1, as can be seen from the right side of the figure showing the side view.

To move an object 131 from position 133 to 135 and back, the gesture in the first case, in which the hand 125 is close to device 1, can be realized by moving only the finger slightly from right to left and back as shown with arrows 137. To achieve the same movement in the second case, the user may move the entire hand 125 with a much larger gesture trajectory indicated by arrows 139.

Figure 6:
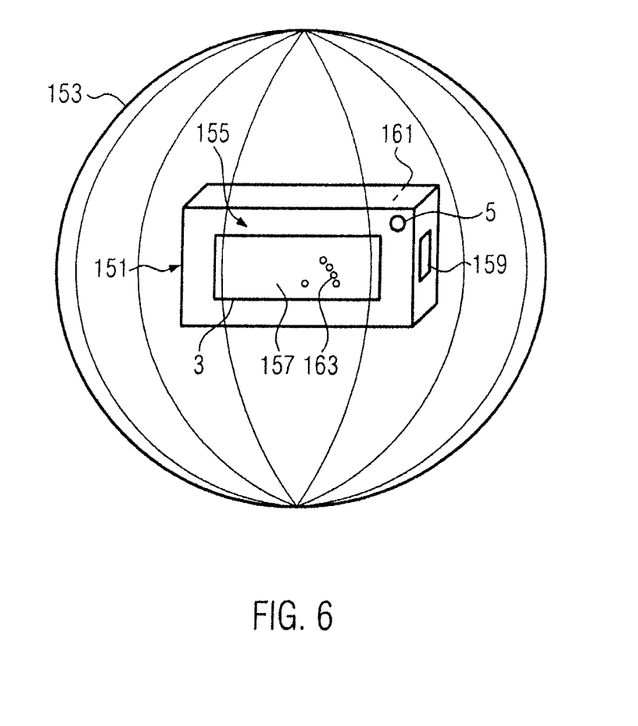
FIG. 6 illustrates a fifth embodiment of the invention relating to a feedback mechanism.

FIG. 6 illustrates a fifth embodiment of the invention illustrating an electronic device 151 comprising touch based interaction means 3 and non-touch based interaction means 5 as in the first embodiment illustrated in FIG. 1, so that a user can provide a touch based interaction when touching the device 151 and/or provide a non-touch based gesture when he enters a predetermined volume 153 around the electronic device 151. Here, the device 151 also comprises a display 157 on the frontside 155, which is the side of the device a user is usually looking at, which forms a touch sensitive screen together with the touch based interaction means 3.

The device furthermore comprises a feedback providing means 159 having the features of the feedback providing means 45 of the first embodiment wherein, in addition, the feedback providing means 159 according to the fifth embodiment of the invention is configured such that in case a user provides a touch based or non-touch based interaction via the backside 161 of device 151, wherein the backside is the side opposite to the frontside 155 and usually faces away from a user, a visual feedback 163 is provided on the display 157. The visual feedback 163 serves to indicate to a user looking at device 151 from the frontside that an input can be provided via the backside 161 of the device 151.

For instance, the feedback signal shown on display 157 could represent the projection of the fingertips of the user's hand when positioned on the back side 161 of the device 151 onto the back or front side surface of the device 151. In FIG. 6 this is schematically illustrated by the five circles 160 on display 157.

This embodiment can be combined with any one of the embodiments one to four.

Figure 7:
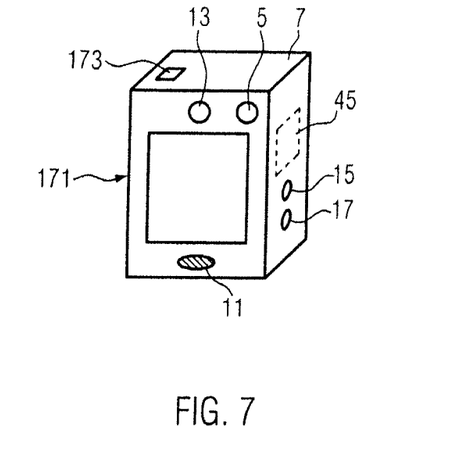
FIG. 7 illustrates a sixth embodiment of the invention relating to an electronic device comprising touch based user interaction means and environmental properties sensing means.

FIG. 7 illustrates a sixth embodiment of the invention. FIG. 7 illustrates a device 171 which comprises the elements and features of the device 1 according to the first embodiment. The elements carrying the same reference numerals also already used before will not be described in detail again but are incorporated herewith by reference.

The electronic device 171 comprises in addition to a touch based user interaction means 3 and a non-touch based user interaction means 5 a sensing means 173 for sensing one or more environmental parameters as a second type of non-touch based interaction. Such environmental parameters could relate to luminosity, an electric field, a magnetic field, electromagnetic radiation, pressure, temperature, humidity, vibrations or the geographical coordinates.

The parameters measured by the sensing means 173, which are thus not linked to a touch based interaction to the device, can also influence the action realized by the device 171 in response to a touch based interaction provided on interaction means 3.

For instance, in case the sensing means identifies that the device is positioned in the dark, any interaction touch and or non-touch based with the device will lead to illuminating a screen of the device or the backlight of the keyboard before allowing a further input; whereas, in case the sensing means identifies that the device is positioned in a bright environment, the same interaction with the device can provoke a different input, e.g. hitting a key will immediately display the corresponding letter on the screen.

The various elements and features of the devices and methods as described with respect to FIGS. 1 and 7 can be combined individually or in combination, with each another to achieve additional inventive devices or methods allowing a natural or intuitive way of interacting with the user.

The invention claimed is:

1. A method for interacting with a device to provide an input to the device characterized in that the interaction is based on a combination of at least one touch based interaction and at least one non-touch based interaction with the device, wherein the one type of interaction adapts the input attributed to the interaction with the device in response to the other type of interaction, comprising:
   sensing a touch based interaction on the device;
   sensing a non-touch based interaction;
   in response to sensing the non-touch based interaction, adapting the input attributed to the non-touch based interaction; and
   selecting an object and providing an instruction to the device in relation to the selected object by:
      selecting the object using the touch based interaction;
      sensing a gesture based on the non-touch based interaction;
      classifying the gesture and depending on the classification, inputting the instruction to the device, wherein the instruction scales with at least one parameter independent of the gesture including at least one of a dimension of the device and a dimension of the object presented on the display; and
      providing the instruction in relation to the selected object based on the non-touch based interaction.

2. The method according to claim 1, wherein at least one realization characteristic of the gesture influences the input attributed to the interaction with the device, the at least one realization characteristic selected from a group consisting of:
   a trajectory of the gesture;
   a speed of the gesture; and
   a duration in time of the gesture.

3. The method according to claim 1, wherein the touch based interaction and the non-touch based interaction occur one after the other or alternately.

4. The method according to claim 1, wherein the touch based interaction and the non-touch based interaction overlap at least partially in time.

5. The method according to claim 1, wherein the touch based interaction occurs on at least one of a frontside, a backside or a side wall of the device.

6. The method according to claim 1, wherein the interaction comprises:
   a registration phase for initiating the input to the device,
   a continuation phase for providing the input to the device, and
   a termination phase for confirming the input to the device.

7. The method according to claim 6, wherein in the termination phase the touch based interaction is used to confirm the input provided in the continuation phase via the non-touch based interaction.

8. The method according to claim 1, further comprising inputting the instruction to move the object on a display of the device by:
   sensing a pinch or squeeze or rotation type gesture provided by the touch based interaction on the device at a first position;
   sensing a translating gesture based on the non-touch based interaction in which the device is untouched;
   sensing a release gesture by either a second touch based or a second non-touch based gesture at or above the device at a second position; and
   moving the object on the display from the first position to the second position based on the pinch or squeeze or rotation gesture, the translating gesture, and the release gesture.

9. The method according to claim 1, further comprising:
   sensing a second touch based interaction;
   in response to the second touch based interaction, setting a parameter;
   sensing at the same time a second non-touch based gesture; and
   in response to the second non-touch based gesture and the parameter, instructing a corresponding action to the device.

10. A computer program product, comprising one or more non-transitory computer readable media having computer-executable instructions that when executed by a processor cause the processor to perform a method comprising:
sensing a touch based interaction on a device;
sensing a non-touch based interaction;
in response to sensing the non-touch based interaction, adapting the input attributed to the non-touch based interaction; and
selecting an object and providing an instruction to the device in relation to the selected object by:
selecting the object using the touch based interaction;
sensing a gesture based on the non-touch based interaction;
classifying the gesture and depending on the classification, inputting the instruction to the device, wherein the instruction scales with at least one parameter independent of the gesture including at least one of a dimension of the device and a dimension of the object presented on the display; and
providing the instruction in relation to the selected object based on the non-touch based interaction.

11. A device, comprising:
a touch based user interaction component configured to sense touch based interactions;
a non-touch based user interaction component configured to sense non-touch based interactions within a predetermined volume around the device;
a feedback providing component configured to output a first signal including one or more of a visual and acoustic output when an object enters into the predetermined volume from outside of the predetermined volume; and
processing circuitry configured to:
determine a touch based interaction based on the touch based user interaction component sensing the touch based interaction on the device;
determine a non-touch based interaction based on the non-touch based user interaction component sensing the non-touch based interaction;
in response to sensing the non-touch based interaction, adapt the input attributed to the non-touch based interaction; and
select an object and providing an instruction to the device in relation to the selected object by:
selecting the object using the touch based interaction; and
providing the instruction in relation to the selected object based on the non-touch based interaction.

12. The device according to claim 11, wherein the feedback providing component is configured to output a second signal including one or more of a second visual, haptic, and acoustic output that is different from the first signal when the object is at least one of inside the predetermined volume and touching the device.

13. The device according to claim 12, wherein:
the feedback providing component is configured to output the second signal as long as at least one of:
the touch based interaction is sensed by the touch based user interaction component; and
the non-touch based interaction is sensed by the non-touch based user interaction component; and
the feedback providing component is configured to output a third signal including one or more of a third visual, acoustic, and haptic output when one or more of:
the touch based interaction is terminated;
the non-touch based interaction is terminated;
the device is switched off; and
the device is in an idle state.

14. The device according to claim 11, further comprising a display on its front side and wherein the feedback providing component is configured to provide a visual indication on the display when an object is detected in the predetermined volume on backside of the device.

15. A device, comprising:
at least one touch based user interaction component configured to sense touch based interactions;
at least one non-touch based user interaction component configured to sense non-touch based interactions; and
processing circuitry configured to:
determine a touch based interaction based on the at least one touch based user interaction component sensing the touch based interaction on the device;
determine a non-touch based interaction based on the at least one non-touch based user interaction component sensing the non-touch based interaction;
determine a pinch or squeeze or rotation type gesture provided by a second touch based interaction on the device at a first position;
determine a translating gesture based on a second non-touch based interaction in which the device is untouched;
determine a release gesture by either a third touch based or a third non-touch based gesture at or above the device at a second position; and
move the object in the display from the first position to the second position based on the pinch or squeeze or rotation gesture, the translating gesture, and the release gesture.

16. The method according to claim 1, further comprising:
in response to sensing the touch based interaction, determining an axis of rotation for an object presented on a display of the device based on a location of the touch based interaction on the device; and
in response to sensing the non-touch based interaction, rotating the object presented on the display along the axis of rotation based on the non-touch based interaction.

17. The device according to claim 11, wherein the processing circuitry is further configured to:
in response to sensing the touch based interaction, determine an axis of rotation for an object presented on a display of the device based on a location of the touch based interaction on the device; and
in response to sensing the non-touch based interaction, rotate the object presented on the display along the axis of rotation based on the non-touch based interaction.

18. The method according to claim 1, wherein the non-touch based interaction includes a second non-touch based interaction that is based on an environmental parameter including one or more of: luminosity, an electric field, a magnetic field, electromagnetic radiation, pressure, temperature, humidity, vibrations, and geographical coordinates.

19. The device according to claim 11, wherein the non-touch based interaction includes a second non-touch based interaction that is based on an environmental parameter including one or more of: luminosity, an electric field, a magnetic field, electromagnetic radiation, pressure, temperature, humidity, vibrations, and geographical coordinates.

* * * * *